United States Patent
Lee et al.

(10) Patent No.: US 10,430,782 B2
(45) Date of Patent: Oct. 1, 2019

(54) MERCHANT-SPECIFIC FUNCTIONALITY SERVICES

(71) Applicant: GOOGLE INC., Mountain View, CA (US)

(72) Inventors: Johnie Lee, Mountain View, CA (US); Titia Tin Yee Wong, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 368 days.

(21) Appl. No.: 15/211,641

(22) Filed: Jul. 15, 2016

(65) Prior Publication Data
US 2017/0017950 A1 Jan. 19, 2017

Related U.S. Application Data

(60) Provisional application No. 62/194,012, filed on Jul. 17, 2015.

(51) Int. Cl.
G06Q 20/32 (2012.01)
G06Q 20/10 (2012.01)
(Continued)

(52) U.S. Cl.
CPC ......... *G06Q 20/3278* (2013.01); *G06Q 20/02* (2013.01); *G06Q 20/102* (2013.01);
(Continued)

(58) Field of Classification Search
CPC .. G06Q 20/3278; G06Q 20/02; G06Q 20/102; G06Q 20/20
(Continued)

(56) References Cited

U.S. PATENT DOCUMENTS

2006/0151598 A1\* 7/2006 Chen ...................... G06Q 20/20
235/380
2007/0278290 A1\* 12/2007 Messerges ............. G06Q 20/10
235/380
(Continued)

FOREIGN PATENT DOCUMENTS

| WO | 2017/015128 A1 | 1/2017 |
| WO | 2017/015131 A1 | 1/2017 |
| WO | 2017/015138 A1 | 1/2017 |

OTHER PUBLICATIONS

Baharlou, "International Preliminary Report on Patentability issued in International Application No. PCT/US2016/042563", dated Feb. 1, 2018, 13 pages.
(Continued)

*Primary Examiner* — Vanel Frenel
(74) *Attorney, Agent, or Firm* — Johnson, Marcou & Isaacs, LLC

(57) ABSTRACT

Processing of merchant-specific functionality services during proximity connection transactions. The merchant terminal transmits additional data to the computing device that enables the device to identify the merchant. The computing device can enable merchant-specific features, such as offers, rewards, loyalty information, and other incentives that are applicable to the identified merchant. The bi-directional communication between the devices permits the computing device to transmit these identified incentives to the merchant terminal. The merchant terminal can then adjust the purchase price. The computing device can also enable a merchant-specific financial instrument and can communicate the identity of the merchant to a management system. The management system can establish a network connection with the merchant to provide larger amounts of data that would otherwise exceed the limited bandwidth of the proximity connection used to establish the secure communication
(Continued)

channel between the computing device and the merchant terminal.

15 Claims, 7 Drawing Sheets

(51) Int. Cl.
*G06Q 20/20* (2012.01)
*G06Q 30/02* (2012.01)
*G06Q 20/02* (2012.01)

(52) U.S. Cl.
CPC ........... *G06Q 20/20* (2013.01); *G06Q 20/202* (2013.01); *G06Q 30/0207* (2013.01); *G06Q 30/0226* (2013.01)

(58) Field of Classification Search
USPC ..... 705/21, 16, 19, 34, 39, 41, 44; 701/300; 455/417, 456.3; 709/226
See application file for complete search history.

(56) References Cited

U.S. PATENT DOCUMENTS

| | | | |
|---|---|---|---|
| 2009/0143104 A1* | 6/2009 | Loh | G06Q 20/32 455/558 |
| 2010/0049654 A1* | 2/2010 | Pilo | G06Q 20/02 705/43 |
| 2010/0082445 A1* | 4/2010 | Hodge | G06Q 20/10 705/21 |
| 2012/0143703 A1 | 6/2012 | Wall et al. | |
| 2012/0284193 A1 | 11/2012 | Bharghavan et al. | |
| 2013/0046643 A1 | 2/2013 | Wall et al. | |
| 2013/0092741 A1* | 4/2013 | Loh | G06Q 20/32 235/492 |
| 2013/0275303 A1* | 10/2013 | Fiore | G06Q 20/32 705/44 |
| 2014/0012704 A1 | 1/2014 | Mizhen et al. | |
| 2014/0074637 A1* | 3/2014 | Hammad | G06Q 20/12 705/21 |
| 2014/0074722 A1 | 3/2014 | Abel | |
| 2014/0227972 A1 | 8/2014 | Swaminathan et al. | |
| 2014/0249945 A1* | 9/2014 | Gauthier | G06Q 20/24 705/17 |
| 2014/0257958 A1 | 9/2014 | Andrews | |
| 2014/0258113 A1* | 9/2014 | Gauthier | G06Q 20/24 705/41 |
| 2015/0025988 A1 | 1/2015 | Fisher | |
| 2015/0235256 A1 | 8/2015 | Barsoum et al. | |
| 2015/0248664 A1 | 9/2015 | Makhdumi et al. | |
| 2017/0017940 A1 | 1/2017 | Lee et al. | |
| 2017/0017951 A1 | 1/2017 | Lee et al. | |

OTHER PUBLICATIONS

Wittmann-Regis, "International Preliminary Report on Patentability issued in International Application No. PCT/US2016/042539", dated Feb. 1, 2018, 11 pages.
Wittmann-Regis, "International Preliminary Report on Patentability issued in International Application No. PCT/US2016/042545", dated Feb. 1, 2018, 11 pages.
Friker, "International Search Report and Written Opinion issued in International Application No. PCT/US2016/042539", dated Sep. 14, 2016, 16 pages.
Friker, "International Search Report and Written Opinion issued in International Application No. PCT/US2016/042545", dated Sep. 14, 2016, 16 pages.
Keogh-Lehmann, "International Search Report and Written Opinion issued in International Application No. PCT/US2016/042563", dated Sep. 14, 2016, 18 pages.
Klaarbergen, "Mobile Payment Transaction: BLE and/or NFC?", White Paper, Apr. 1, 2014, 9 pages.
NFC Forum Inc, "Connection Handover Technical Specification NFC Forum", Connection Handover 1.2, Jul. 7, 2010, 27 pages.
Gottschalk, "U.S. Office Action issued in copending U.S. Appl. No. 15/211,627, filed Jul. 15, 2016", dated Oct. 2, 2018, 14 pages.
Gottschalk, "U.S. Office Action issued in copending U.S. Appl. No. 15/211,746, filed Jul. 15, 2016", dated Oct. 3, 2018, 13 pages.
Gottschalk "U.S. Office Action issued in copending U.S. Appl. No. 15/211,746 filed Jul. 15, 2016", dated Jun. 3, 2019, 17 pages.
Gottschalk "U.S. Office Action issued in copending U.S. Appl. No. 15/211,627 filed Jul. 15, 2016", dated Jun. 3, 2019, 18 pages.

* cited by examiner

MERCHANT-SPECIFIC FUNCTIONALITY SERVICES

CROSS-REFERENCE TO RELATED APPLICATION

This application claims priority to U.S. Patent Application No. 62/194,012, filed Jul. 17, 2015, and entitled "Merchant-Specific Functionality Services During Payment Transactions." The entire contents of the above-identified priority application are hereby fully incorporated herein by reference.

TECHNICAL FIELD

The present disclosure relates to enabling and processing of merchant-specific functionality services during proximity connections providing merchant identification and improved mobile computing device processing capabilities that allow for merchant-specific account processing, creation of a network-enabled connection between the merchant system and an account management system that enables transmission of large amounts of data that otherwise exceeds the capabilities of a short range proximity connection, bi-directional communications, enriched communications, and improved data gathering.

BACKGROUND

In a conventional merchant-consumer transaction, the consumer provides financial account information to the merchant by way of swiping a card, entering the account number, scanning a code comprising the account number, reading the account number to the merchant, or otherwise transmitting the account number to a merchant system. The merchant system's point of sale terminal or online payment processor submits a payment request to the issuer of the account through the corresponding card network. If funds are available, the issuer sends an authorization code to the merchant system to signal approval of the payment transaction.

Near Field Communication (NFC) is a proximity communication technology that can enable contactless device payment technologies and that is supported by the Global System for Mobile Communications (GSM) Association. Radio frequency identification (RFID) is another wireless communication technology that can be adapted to enable NFC smart card payment technology. NFC communication generally is conducted in a range from about 3 to about 4 inches. Such short communication distances enable secure communication between close field proximity enabled devices. In operation of an NFC transaction, a user "taps" a device, such as an NFC-enabled mobile phone or NFC-enable smart card, to a reader. The reader recognizes the NFC-enabled device when the device is moved within range of the reader and establishes a secure communication channel with the device. The short range proximity connection between the devices enables transmission of limited data to facilitate a payment transaction between the reader and the device. The short range proximity connection is limited by a small bandwidth, and thus only allows for the exchange of a limited amount of information between the devices.

A mobile computing device, such as a mobile phone or a tablet, can be used to complete a NFC payment transaction. Unlike a traditional payment card or device, the mobile computing device has a processing capabilities that enable the device to receive additional information concerning the transaction and process decisions based on user choices or pre-defined rules stored in an application, such as a digital wallet application. However, during a traditional NFC payment transaction, only limited transaction-specific data (for example, a purchase price) is transmitted to the mobile computing device in the payment request. The limited nature of the payment request and the small bandwidth of the NFC connection limits the additional processing capabilities of the mobile computing device.

There are two types of financial accounts that can be used in payment transactions. Open loop financial accounts can be used at any merchant location (for example, VISA or MasterCard). Private label financial accounts are limited to use only at specific merchant locations (for example, Merchant X Credit Card). During NFC payment transaction, the communication between the merchant reader and the mobile computing device is limited to information contained in the payment request. Thus, the mobile computing device is unable to determine whether the merchant reader supports private label financial accounts. Accordingly, traditional mobile computing device digital wallet applications only support open loop financial accounts during NFC payment transaction.

SUMMARY

In certain example aspects described herein, a method for processing of merchant-specific functionality services during proximity connection payment transactions comprises a communication protocol that enables a bi-directional communication between the devices that exceeds the typical request for payment information and payment response communication. The communication protocol instead allows for the POS terminal to transmit additional data to the user computing device that enables the device to identify the merchant system and/or POS terminal. The user computing device can enable merchant-specific features, such as merchant-specific offers, rewards, loyalty information, and other incentives that are applicable to the identified merchant. The bi-directional communication between the devices permits the user computing device to transmit these identified merchant-specific offers, rewards, loyalty information, and other incentives to the POS terminal. The POS terminal can then adjust the purchase price and transmits a purchase request for the adjusted purchase price. The user computing device can also enable a merchant-specific financial instrument and can communicate the identity of the merchant to a management system. The management system can establish a network connection with the merchant or POS terminal to provide larger amounts of data that would otherwise exceed the limited bandwidth of the proximity connection used to establish the secure communication channel between the user computing device and the POS terminal.

In certain other example aspects described herein, systems and computer program products to authenticate users are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
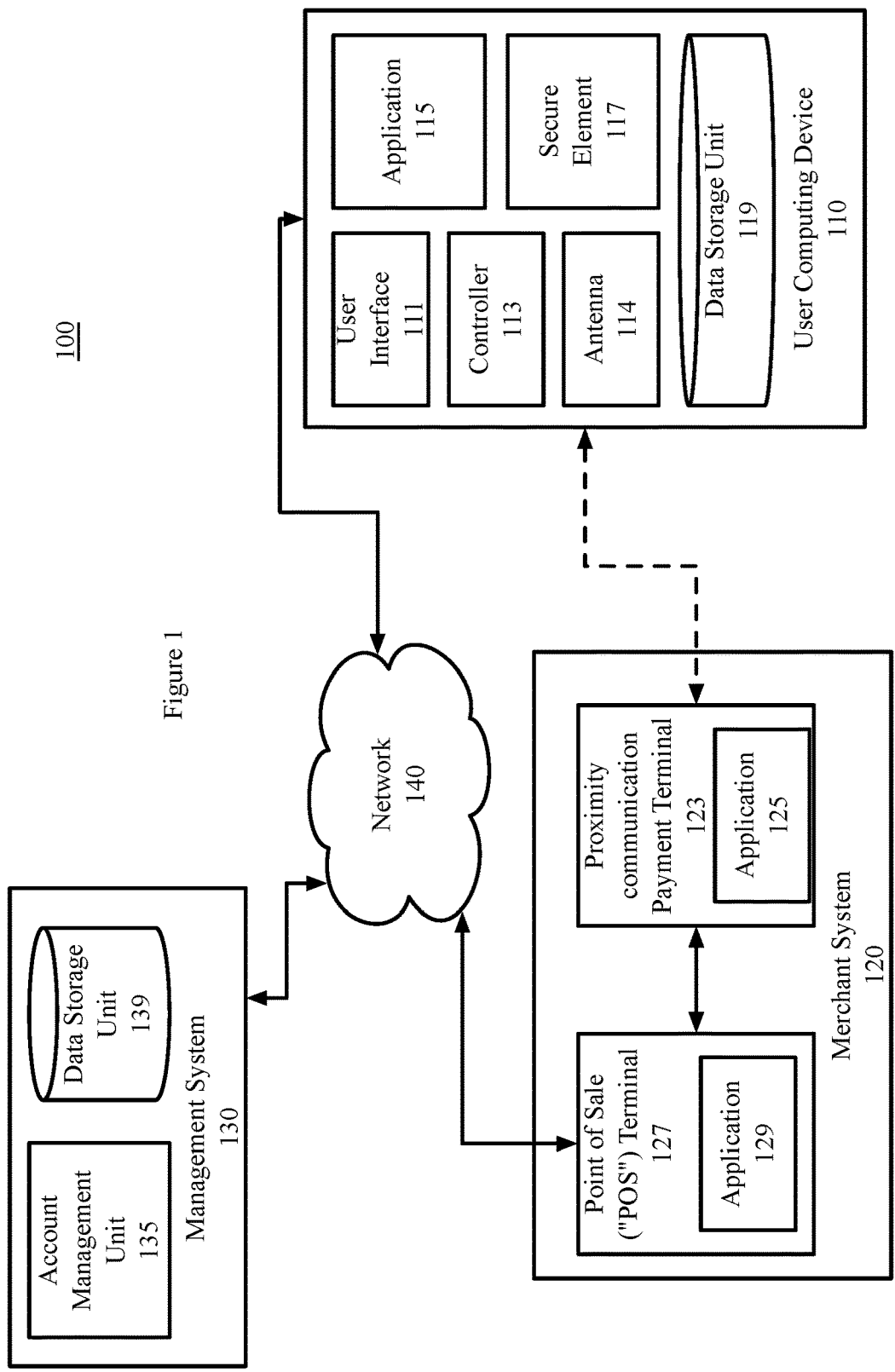
FIG. 1 is a block diagram depicting a proximity connection payment system, in accordance with certain example embodiments.

The example embodiments described herein provide methods and systems that enable the processing of merchant-specific functionality services during proximity connection payment transactions. By providing a merchant identification, the merchant system is enabling the mobile computing device to allow for merchant-specific financial account processing, payment price adjustment and processing of merchant-specific offers and loyalty information, and creation of a network-enabled connection between the merchant system and an account management system that enables transmission of large amounts of data that otherwise exceeds the capabilities of a short range proximity connection.

In an example embodiment, a user engages in a payment transaction with a merchant system by enabling the creation of a secure communication channel between a user computing device and merchant point of sale (POS) terminal via a proximity payment terminal. During the creation of the secure communication channel the device specify a communication protocol that enables a bi-directional communication between the devices that exceeds the typical request for payment information and payment response communication. The communication protocol instead allows for the POS terminal to transmit additional data to the user computing device through the proximity communication payment terminal that enables the user computing device to identify the merchant system and/or POS terminal. By identifying the merchant system and/or POS terminal, the user computing device can enable merchant-specific features that were otherwise unavailable. For example, the user computing device can identify merchant-specific offers, rewards, loyalty information, and other incentives that are applicable to the identified merchant. The bi-directional communication between the devices permits the user computing device to transmit these identified merchant-specific offers, rewards, loyalty information, and other incentives to the POS terminal through the proximity communication payment terminal. The POS terminal can then adjust the purchase price and transmits a purchase request for the adjusted purchase price.

In another example, by identifying the merchant, the user computing device can enable a merchant-specific financial instrument (for example, Merchant Z credit card). In this example, the merchant-specific financial instrument is only capable of being used with the merchant (continuing with the previous example, the Merchant Z credit card is only capable of being used at Merchant Z). Because the merchant was identified, the user computing device can transmit the merchant-specific financial instrument for payment.

In yet another example, by identifying the merchant, the user computing device can communicate the identity of the merchant to a management system. The management system, which operates outside of the financial transaction and is not a part of the financial payment authorization path, is otherwise not notified of the ongoing payment transaction. The management system can establish a network connection with the merchant or POS terminal to provide larger amounts of data that would otherwise exceed the limited bandwidth of the proximity connection used to establish the secure communication channel between the user computing device and the POS terminal. The network connection can provide an enriched communication of data to the POS terminal and enrich the user's shopping experience.

By using and relying on the methods and systems described herein, the devices can broaden the otherwise limited capacity of the narrow bandwidth of a proximity communication to enable bi-directional communications during payment transactions. The resulting communications enable the enriched processing of payment transaction and expedited responsiveness to merchant-specific offers and incentives during the payment transaction.

Additionally, since the management system is outside of the payment transaction, by not functioning as the issuer of the financial account information, the management system is unable to determine whether a financial transaction was completed. By using and relying on the methods and systems described herein, the management system is able to determine that the purchase transaction was completed without being a part of the transaction or receiving a payment confirmation. Systems and devices that are outside of or not a part of the financial transaction path are not notified and are unable to determine that the financial transaction was approved and completed unless the merchant or consumer provide confirmation of the completion. As such, the systems and methods described herein may be employed to bridge the gap between the online and offline worlds and allow for the interaction between different types of computing technologies (for example, merchant point-of-sale devices, user mobile computing devices, and management system computing devices) to achieve improved data gathering, improved understanding of how payment products are being used, and improved logging of transactions outside of the financial transaction path and without confirmation of a payment transaction.

Various example embodiments will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting proximity connection payment system, in accordance with certain example embodiments. As depicted in FIG. 1, the exemplary operating environment 100 comprises a user computing device 110 and a merchant system 120 that are configured to communicate with one another via a secure communication channel. As depicted in FIG. 1, the exemplary operating environment 100 further comprises a management system 130 that is configured to communicate with the merchant system 120 and the user computing device 110 via one or more networks 140. In another example embodiment, two or more of these systems (including systems 110, 120, and 130) are integrated into the same system. In some embodiments, a user associated with a device must install an application and/or make a feature selection to obtain the benefits of the techniques described herein.

In exemplary embodiments, the secure communication channel can comprise communication via a close proximity communication protocol, such as near field communication (NFC), Bluetooth, Wi-Fi, any form of standardized radio frequency, other short range communication channel, or any combination thereof, using appropriate protocols corresponding to those communication methods. In an alternative exemplary embodiment, the secure communication channel can comprise a cellular network.

Each network 140 comprises a wired or wireless telecommunication means by which the merchant system 120 and the user computing device can communicate and exchange data with the management system 130. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, infrared, sound (for example, audible sounds, melodies, and ultrasound), or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) comprises a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by users, merchants, and a management system operator, respectively.

In an example embodiment, the user computing device 110 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that includes or is coupled to an application 114 suitable for interacting with a point of sale (POS) terminal 123 and completing a payment transaction. The user can use the user computing device 110 to complete the payment transaction via a user interface 111 and the application 115.

The application 115 is a program, function, routine, applet or similar entity that exists on and performs its operations on the user computing device 110. For example, the application 115 may be one or more of a shopping application, merchant system 120 application, an Internet browser, a digital wallet application, a loyalty card application, another value-added application, a user interface 111 application, or other suitable application operating on the user computing device 110. In some embodiments, the user must install an application 115 and/or make a feature selection on the user computing device 110 to obtain the benefits of the techniques described herein.

The user computing device 110 communicates with the proximity communication payment terminal 123 via an antenna 114. In an example embodiment, once a user computing device 110 application 115 has been activated and prioritized, the controller 113 is notified of the state of readiness of the user computing device 110 for a transaction. The controller 113 outputs through the antenna 113 a radio signal, or listens for radio signals from the proximity communication payment terminal. On establishing a secure communication channel between the user computing device 110 and the proximity communication payment terminal 123, the proximity communication payment terminal 123 transmits a merchant identifier to the user computing device 110.

An example controller 113 receives a radio wave communication signal from the proximity communication payment terminal 123 transmitted through the antenna 114. The controller 113 converts the signal to readable bytes. In an example embodiment, the bytes comprise digital information, such as a request for a payment processing response or a request for payment card information. The controller 113 transmits the request to the secure element 117.

An example user computing device 110 comprises a secure element 117 or secure memory, which can exist within a removable smart chip or a secure digital (SD) card, which can be embedded within a fixed chip on the device 110, or be realized as a secure compartment of a security-enhanced operating system. In certain example embodiments, Subscriber Identity Module (SIM) cards may be capable of hosting a secure element 117, for example, an NFC SIM Card. The secure element 117 allows a software application 115 resident on the device 110 and accessible by the device user to interact securely with certain functions within the secure element 117, while protecting information stored within the secure element 117. The secure element 117 comprises applications running thereon that perform the functionality described herein. In an example embodiment, the secure element 117 comprises components typical of a smart card, such as crypto processors and random generators. In an example embodiment, the secure element 117 comprises a Smart MX type NFC controller in a highly secure system on a chip controlled by a smart card operating system, such as a JavaCard Open Platform (JCOP) operating system. In another example embodiment, the secure element 117 is configured to include a non-EMV type contactless smart card, as an optional implementation. The secure element 117 communicates with the application 115 in the user computing device 110. In an example embodiment, the secure element 117 is capable of storing encrypted user information and only allowing trusted applications to access the stored information. In an example embodiment, a controller (not shown) interacts with a secure key encrypted application 115 for decryption and installation in the secure element 117.

Additionally, the secure element 117 also may comprise secure software applications, such as payment applications, secure forms of the applications 115, authentication applications, payment provisioning applications, or other suitable application using the secure functionality of the secure element 117.

In an example embodiment, the data storage unit 119 and application 115 may be implemented in the secure element 117, as described previously, on the user computing device 110. In another example embodiment, the data storage unit 119, may be a separate memory unit resident on the user computing device 110. An example data storage unit 119 enables storage of user financial information for creation of a single-use payment code and storage of user contact details for retrieval of a user account management system 130 account.

In an example embodiment, the data storage unit 119 and application 115 may be implemented in a secure element 117 or other secure memory on the user computing device 110. In another example embodiment, the data storage unit 119 may be a separate memory unit resident on the user computing device 110. An example data storage unit 119 enables storage of user financial account information, merchant system 120 offers, user contact details, and other information used during a payment transaction. In an example embodiment, the data storage unit 119 can include any local or remote data storage structure accessible to the user computing device 110 suitable for storing information. In an example embodiment, the data storage unit 119 stores encrypted information, such as HTML5 local storage.

An example user computing device 110 communicates with the management system 130. An example management system 130 comprises an account management unit 135. In an example embodiment, the account management unit 135 maintains a user account for the user of the user computing device 110. An example user account comprises user registration information, financial payment account information, offers, merchant system 120 loyalty information, and other information designated by the user to be saved in the user account. In an example embodiment, the user account information is saved in the data storage unit 139.

In an example embodiment, the data storage unit 139 can include any local or remote data storage structure accessible to the management system 130 suitable for storing information. In an example embodiment, the data storage unit 139 stores encrypted information.

In an example embodiment, the management system 130 receives a merchant identifier, for example, a merchant name, address, POS terminal 127 identifier, merchant category code, or other form of identification from the user computing device 110. Based on the merchant identifier, the management system 130 can identify the POS terminal 127 that the user computing device 110 is engaged in a payment transaction with. Once identified, the management system 130 can transmit information via the network 140 to the POS terminal 127 for use during the payment transaction. In an example embodiment, the communication via the network 140 allows for communication of information that is otherwise unable of transmission over the limited bandwidth of the short range proximity connection between the user computing device 110 and the proximity communication payment terminal 123.

The merchant system 120 comprises at least one point of sale (POS) terminal 127 that is capable of processing a purchase transaction initiated by a user. In an example embodiment, the merchant operates a commercial store and the user indicates a desire to make a purchase by taping the user computing device 110 or enabling a secure communication channel to be formed between the user computing device 110 and a proximity communication payment terminal 123.

In an example embodiment, the proximity communication payment terminal 123 is capable of communicating with the user computing device 110 using an application 125. While the application 125 is depicted as an integrated part of the proximity communication payment terminal 123, the application 125 may also be an integrated part of a merchant device (not shown) or a standalone hardware device (not shown), in accordance with alternative example embodiments. In an example embodiment, the proximity communication payment terminal 123 is capable of communicating with the user computing device 110 using an NFC communication method. In another example embodiment, the proximity communication payment terminal 123 is capable of communicating with the user computing device 110 using a Bluetooth communication method. In yet another embodiment, the proximity communication payment terminal 123 is capable of communicating with the user computing device 110 using a Wi-Fi communication method.

The user requests a purchase from the merchant system 120. The merchant system 120 receives or otherwise reads payment account information from the user computing device 110. In an example embodiment, the purchase is initiated by a wireless "tap" of the user computing device 110 with the proximity communication payment terminal 123. In an example embodiment, the POS terminal 127 manages the proximity communication payment terminal 123. For example, the POS terminal 127 instructs the proximity communication payment terminal 123 which communication modes and capabilities it can use to communicate with the user computing device 110. In an example embodiment, the capability to communication with the user computing device 110 is derived from the proximity communication payment terminal 123, but the processing and payment features are derived from the POS terminal 127. In an example embodiment, the proximity communication payment terminal 123 and the POS terminal 127 are communicatively coupled within the merchant system 120. In another example embodiment, the proximity communication payment terminal 123 and the POS terminal 127 are comprised within the same device (not shown).

Figure 7:
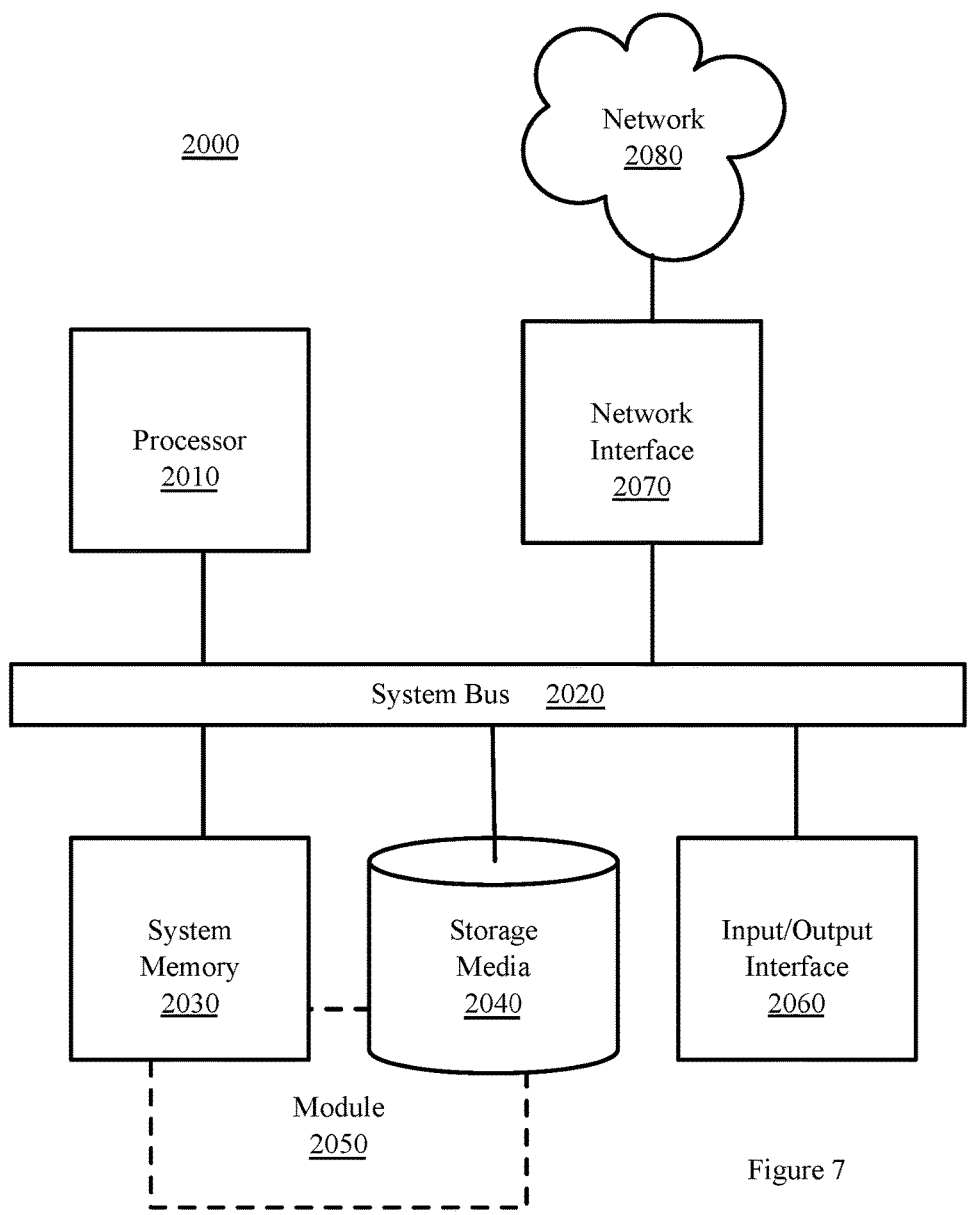
FIG. 7 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 7. Furthermore, any functions, applications, or modules associated with any of these computing machines, such as those described herein or any others (for example, scripts, web content, software, firmware, or hardware) associated with the technology presented herein may be any of the modules discussed in more detail with respect to FIG. 7. The computing machines discussed herein may communicate with one another as well as other computer machines or communication systems over one or more networks, such as network 140. The network 140 may include any type of data or communications network, including any of the network technology discussed with respect to FIG. 7.

The components of the example operating environment 100 are described hereinafter with reference to the example methods illustrated in FIGS. 2-6. The example methods of FIGS. 2-6 may also be performed with other systems and in other environments.

Example System Processes

Figure 2:
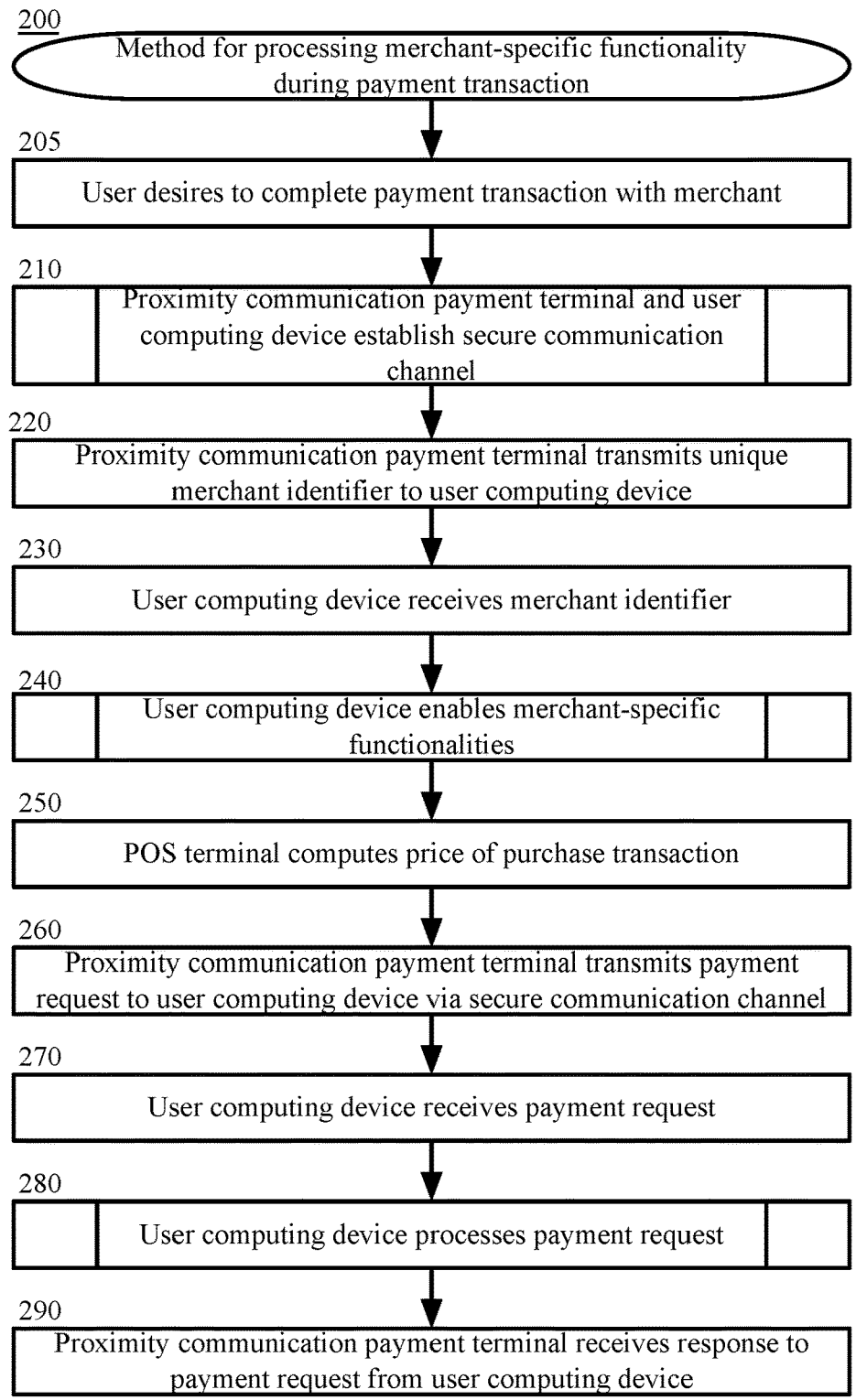
FIG. 2 is a block flow diagram depicting a method for processing merchant-specific functionality during a payment transaction, in accordance with certain example embodiments.

FIG. 2 is a block flow diagram depicting a method for processing merchant-specific functionality during a payment transaction, in accordance with certain example embodiments. The method 200 is described with reference to the components illustrated in FIG. 1.

A user installs, downloads, or otherwise enables a payment processing application 115, a digital wallet application 115, or other financial transaction application 115 on the user computing device 110. In an example embodiment, once the user enables the application 115 on the user computing device 110, the device 110 becomes capable of performing a payment transaction with a POS terminal 127 via a proximity communication payment terminal 123. In an example embodiment, the user can enable the application 115 on more than one user computing device 110. In this embodiment, each user computing device 110 may possess the same or different financial account information for use in processing a payment transaction. In another example embodiment, the user can disable or uninstall the application 115 at any time and on any number of previously enabled user computing devices 110.

In block 205, a user indicates a desire to complete a transaction with a merchant. In an example embodiment, the user accesses an application 115 on the user computing device 110 and initiates a transaction. For example the application 115 is a merchant shopping application 115, digital wallet application 115, or other application that enables the user to perform an electronic financial transaction by wirelessly transmitting financial account information to the POS terminal 127 through the proximity communication payment terminal 123. In another example embodiment, the user has previously authorized the application 115 and/or user computing device 110 to perform a financial transaction and the user indicates a desire to complete the transaction by tapping or placing the user computing device 110 within a predefined distance from the proximity communication payment terminal 123.

In block 210, proximity communication payment terminal 123 and the user computing device 110 establish a secure communication channel. In an example embodiment, the communication channel is an NFC communication channel. In some example embodiments, the communication channel is a Bluetooth communication channel. In yet another example embodiment, the communication channel is a Wi-Fi communication channel. Accordingly, the payment transaction can be conducted via wireless or "contactless" communication between the user computing device 110 and the proximity communication payment terminal 123. The method for establishing a secure communication channel is described in more detail hereinafter with reference to the methods described in FIG. 3.

Figure 3:
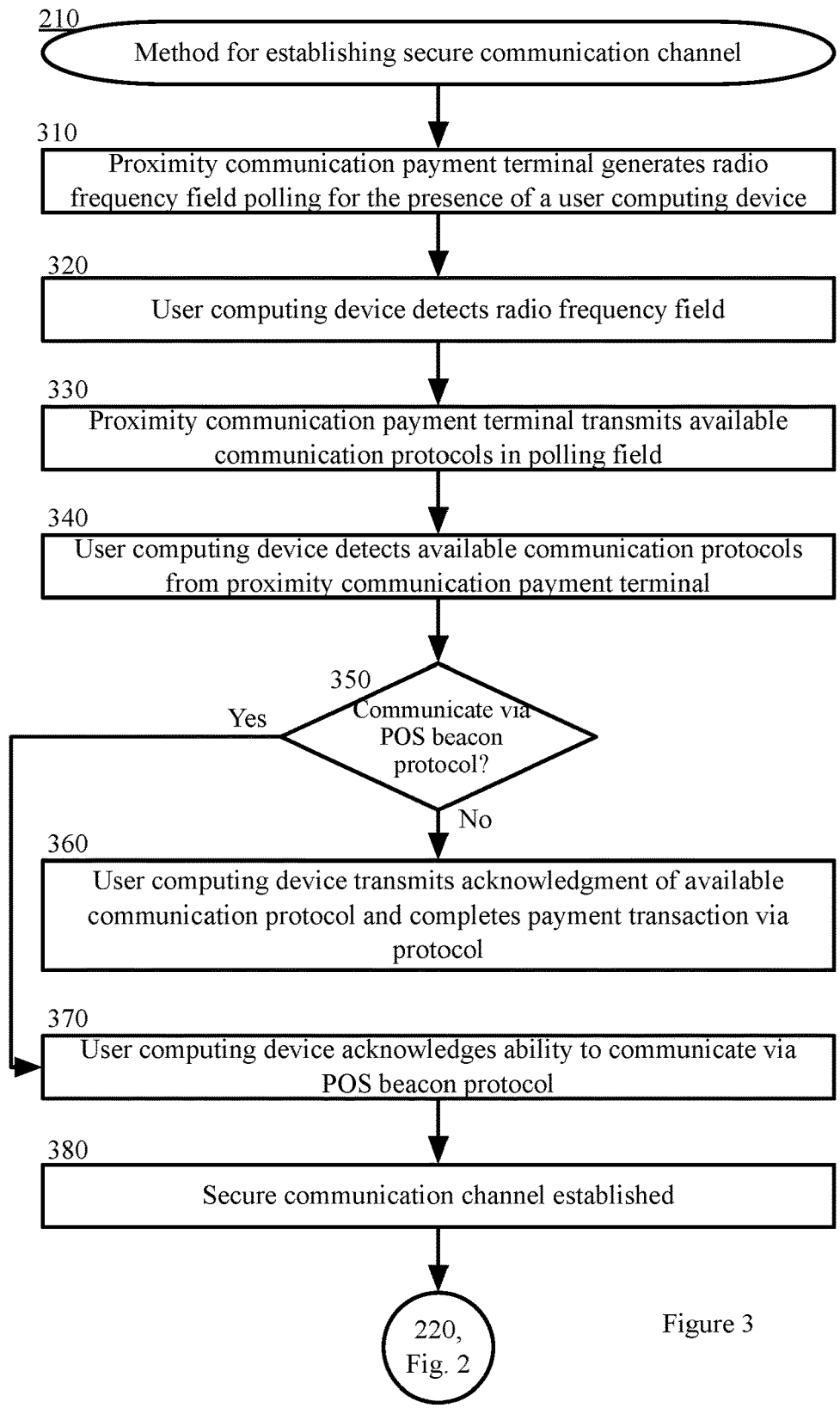
FIG. 3 is a block flow diagram depicting a method for establishing a secure communication channel, in accordance with certain example embodiments.

FIG. 3 is a block flow diagram depicting a method 210 for establishing a secure communication channel, in accordance with certain example embodiments, as referenced in block 210. The method 210 is described with reference to the components illustrated in FIG. 1.

In block 310, the user taps the user computing device 110 in the proximity of the proximity communication payment terminal 123. In an example embodiment, the proximity communication payment terminal 123 generates a radio frequency (RF) or other field polling for the presence of a user computing device 110, and the user "taps" the user computing device 110 by placing the device 110 within the field of the proximity communication payment terminal 123. In some example embodiments, the merchant activates the RF field or other field to poll for the presence of a user computing device 110 using an application 125 on the proximity communication payment terminal 123.

In block 320, the user computing device 110 detects the RF field generated by the proximity communication payment terminal 123. In an example embodiment, the user enables a feature on the user computing device 110 allowing for the detection of the RF field. In an example embodiment, the antenna 114 on the user computing device 110 detects the RF field generated by the proximity communication payment terminal 123. In an example embodiment, the user computing device 110 transmits an acknowledgement of the proximity communication payment terminal 123 when the RF field is detected.

In block 330, the proximity communication payment terminal 123 transmits a listing of available communication protocols to the user computing device 110 through the polling field. In an example embodiment, the proximity communication payment terminal 123 requests protocols and characteristics from the user computing device 110 to establish the communication channel. For example, the proximity communication payment terminal 123 may request the identification of communication protocols (for instance ISO/IEC 14443, MIFARE, and/or ISO/IEC 18092), a list of applications available, and security protocols from the user computing device 110. In an example embodiment, the POS terminal 127 transmits the list of available communication protocols to the proximity communication payment terminal 123 for transmission to the user computing device 110.

In an example embodiment, the list of communication protocols transmitted by the proximity communication payment terminal 123 comprises a POS beacon handshake protocol. The POS beacon handshake protocol enables the devices (including the proximity communication payment terminal 123 and the user computing device 110) to exchange information through the secure communication channel to identify the merchant system and/or POS terminal 127 in a manner understood by the management system 130 and/or user computing device 110. For example, the POS beacon handshake protocol allows the proximity communication payment terminal 123 to transmit an identifier that is understood by the user computing device 110 to identify the merchant system 120. Accordingly, the user computing device 110 can use the identifier to analyze information stored in the data storage unit 119 and identify merchant-specific offers, merchant-specific loyalty information, financial accounts, user-defined rules, and user preferences that are associated with the identified merchant system 120.

In another example embodiment, the merchant identifier is transmitted by the user computing device 110 to the management system 130 to enable further processing and transmission of larger amounts of data to the POS terminal 127. In this embodiment, the management system 130 can use the identifier to identify the merchant system 120 and/or POS terminal 127. Accordingly, the management system 130 can use the identifier to analyze information stored in the user account and identify merchant-specific offers, merchant-specific loyalty information, financial accounts, user-defined rules, and user preferences/information that are associated with the identified merchant system 120.

In block 340, the user computing device 110 detects the available communication protocols transmitted by the proximity communication payment terminal 123. In an example embodiment, the user computing device 110 reviews the list of communication protocols from the proximity communication payment terminal 123 and determines which communication protocols the device 110 is capable of using to communicate with the proximity communication payment terminal. In an example embodiment, the user computing device 110 retrieves a listing of communication protocols by which the device is capable of communicating with and cross-references the list with those receives from the proximity communication payment terminal 123.

In an example embodiment, the list transmitted by the proximity communication payment terminal 123 is ranked or provides an indication of a preferred communication method. In this example embodiment, the POS beacon handshake protocol is a preferred communication method.

In block 350, the user computing device 110 determines whether it is capable of communicating via the POS beacon communication protocol.

If the user computing device is not capable of communicating via the POS beacon communication protocol, the method 210 proceeds to block 360. In block 360, the user computing device 110 transmits an acknowledgement of the available communication protocol to the proximity communication payment terminal 123. In an example embodiment, the devices (including devices 110 and 123) establish a communication channel using the available communication protocol and complete a payment transaction using the available communication protocol.

Returning to block 350 in FIG. 3, if the user computing device is capable of communicating via the POS beacon communication protocol, the method 210 proceeds to block 370.

In block 370, the user computing device 110 acknowledges the device's 110 ability to communicate via the POS beacon communication protocol. In an example embodiment, the acknowledgement is transmitted to and received by the proximity communication payment terminal 123. In an example embodiment, the acknowledgement signals to the proximity communication payment terminal 123 to establish the secure communication channel and notifies the proximity communication payment terminal 123 to transmit the merchant identifier to the user computing device 110. In an example embodiment, the acknowledgement also signals to the POS terminal 127 that offers, loyalty information, user information, and/or other information may be transmitted by the user computing device 110 and/or management system 130 during the payment transaction. In this embodiment, the purchase price may require adjustment based on the information exchanged.

In an example embodiment, the POS beacon communication protocol comprises a non-Proximity Payment System Environment (non-PPSE) protocol that enables the digital wallet application 115 on the user computing device 110 to convey offers and loyalty information to the POS terminal 127 through the proximity communication payment terminal 123 as a result of receiving a merchant identifier from the proximity communication payment terminal 123.

In block 380, the user computing device 110 and proximity communication payment terminal 123 establish a secure communication channel. In an example embodiment, the communication channel is an NFC communication channel. In some example embodiments, the communication channel is a Bluetooth communication channel. In yet another example embodiment, the communication channel is a Wi-Fi communication channel. Accordingly, information can be exchanged and the payment transaction can be conducted via wireless or "contactless" communication between the user computing device 110 and the proximity communication payment terminal 123.

The method 210 then proceeds to block 220 in FIG. 2.

In block 220, proximity communication payment terminal 123 transmits a unique merchant identifier to the user computing device 110. In an example embodiment, the unique merchant identifier comprises one or more of a merchant name, merchant location, POS terminal 127 code or identification, merchant code or identification, a merchant category code, proximity communication payment terminal code or identification or other identification of the merchant system 120, POS terminal 127, and/or merchant. In an example embodiment, the merchant identifier is transmitted to the user computing device 110 in metadata or as part of a key exchange with the user computing device 110. In another example embodiment, the merchant identifier is transmitted to the user computing device 110 as a message transmission through the secure communication channel established between the devices (including devices 110 and 123).

In block 230, the user computing device 110 receives the merchant identifier from the proximity communication payment terminal 123. In an example embodiment, the uniqueness of the POS beacon communication protocol enables the exchange of the merchant identifier. As a result, the user computing device 110 and the management system 130 can perform higher levels of processing than could be performed without the identifier, for example, the enablement of merchant-specific functionalities.

In block 240 user computing device 110 enables merchant-specific functionalities. In an example embodiment, the merchant identifier enables the user computing device 110 and/or management system 130 to identify the merchant system 120 and interrupt the payment process by providing information to the POS terminal 127 through the proximity communication payment terminal 123 that is specific to the merchant system 120 without the user having to manually retrieve and present the information (for example, offers, loyalty information, merchant-specific financial accounts). The method for enabling merchant-specific functionalities is described in more detail hereinafter with reference to the methods described in FIG. 4.

Figure 4:
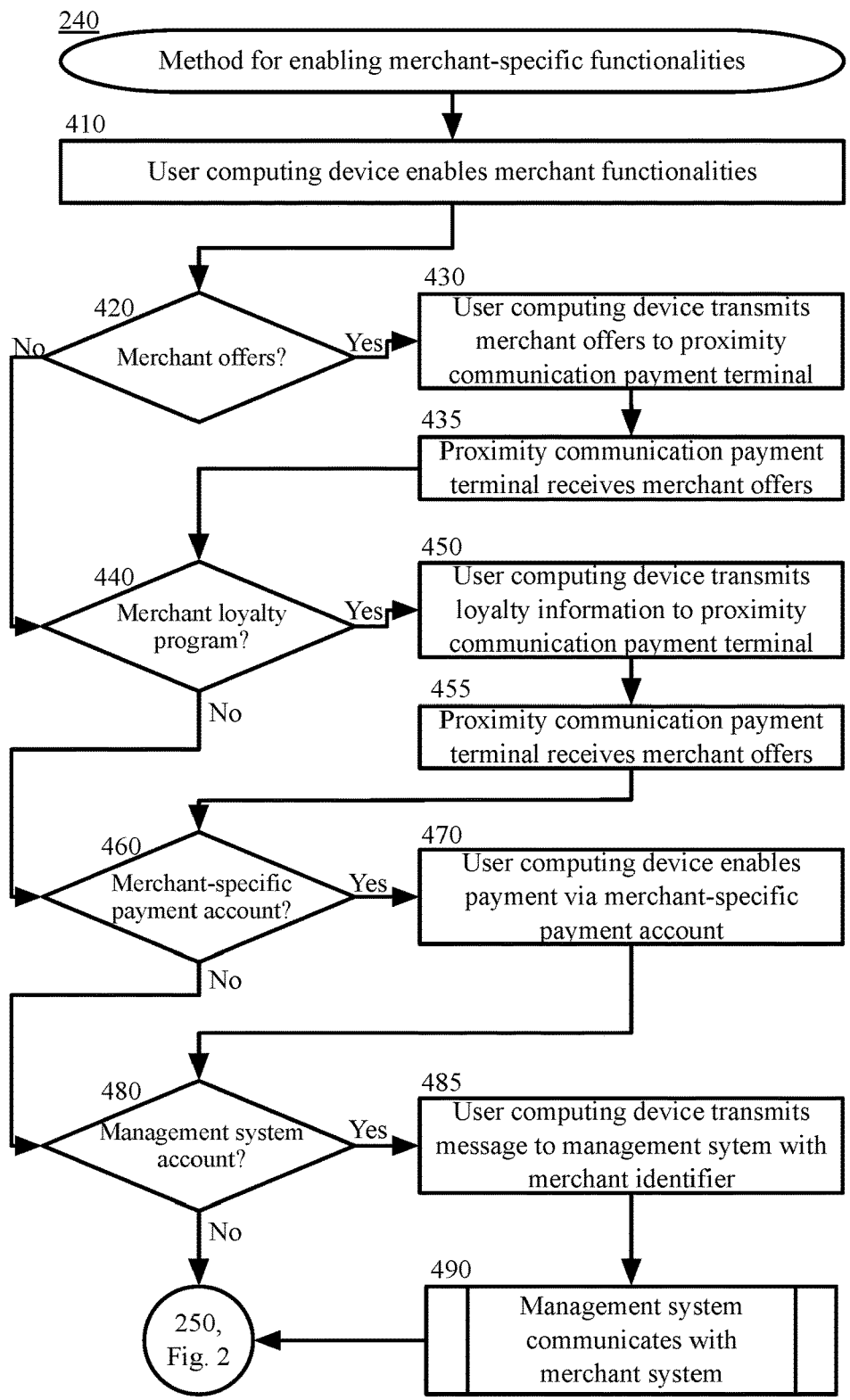
FIG. 4 is a block flow diagram depicting a method for enabling merchant-specific functionalities, in accordance with certain example embodiments.

FIG. 4 is a block flow diagram depicting a method 240 for enabling merchant-specific functionalities, in accordance with certain example embodiments, as referenced in block 240. The method 240 is described with reference to the components illustrated in FIG. 1.

In block 410, the user computing device 110 enables merchant functionalities on the user computing device 110. In an example embodiment, the user computing device 110 reviews the merchant identifier and determines the identity of the merchant system 120. In an example embodiment, the user computing device 110 cross-references the merchant identifier with a listing of merchant systems 120 or known merchant identifiers. In this embodiment, the management system 130 may periodically transmit an updated listing of merchant identifiers and corresponding identities of merchant systems 120 to the user computing device 110. In another example embodiment, the user computing device 110 determines the location or identity of the POS terminal 127. In an example embodiment, once determining the merchant system 120 and/or POS terminal 127 identity, the user computing device 110 can determine whether the user has define a rule or preference specific to the identified merchant system 120 and/or POS terminal 127. In another example embodiment, the user computing device 110 can determine whether the user has an offer, loyalty information, rewards, or other incentives that are specific to the identified merchant system 120 and/or POS terminal 127.

In block 420, the user computing device 110 determines whether the user has one or more merchant-specific offers that correspond to the identified merchant system 120 and/or POS terminal 127. In an example embodiment, the user computing device 110 cross-references the identity of the merchant system 120 and/or POS terminal 127 with the offers saved by the application 115.

If the user has one or more merchant-specific offers that correspond to the identified merchant system 120 and/or POS terminal 127, the method 240 proceeds to block 430. In block 430, the user computing device 110 transmits the merchant-specific offers to the POS terminal 127 through the proximity communication payment terminal 123. In an example embodiment, the user computing device 110 transmits the merchant-specific offers through the secure communication channel to the proximity communication payment terminal 123. The proximity communication payment terminal 123 transmits the received merchant-specific offers to the POS terminal 127 for processing. In another example embodiment, the user computing device 110 transmits the offers to the management system 130 via the network 140 and the management system 130 transmits the offers to the POS terminal 127 via the merchant system 120 and the network 140.

In block 435, the POS terminal 127 receives the merchant-specific offers.

The method 240 then proceeds to block 440 in FIG. 4.

Returning to block 420 in FIG. 4, if the user does not have one or more merchant-specific offers that correspond to the identified merchant system 120 and/or POS terminal 127, the method 240 proceeds to block 440.

In block 440, the user computing device 110 determines whether the user has merchant-specific loyalty information that correspond to the identified merchant system 120 and/or POS terminal 127. In an example embodiment, the user computing device 110 cross-references the identity of the merchant system 120 and/or POS terminal 127 with the loyalty information saved by the application 115.

If the user has merchant-specific loyalty information that correspond to the identified merchant system 120 and/or POS terminal 127, the method 240 proceeds to block 450. In block 450, the user computing device 110 transmits the merchant-specific loyalty information to the POS terminal 127. In an example embodiment, the user computing device 110 transmits the merchant-specific loyalty information through the secure communication channel to the proximity communication payment terminal 123. The proximity communication payment terminal 123 transmits the received merchant-specific loyalty information to the POS terminal 127. In another example embodiment, the user computing device 110 transmits the loyalty information to the management system 130 via the network 140 and the management system 130 transmits the loyalty information to the POS terminal 127 via the merchant system 120 and the network 140.

In block 455, the POS terminal 127 receives the merchant-specific loyalty information.

The method 240 then proceeds to block 460 in FIG. 4.

Returning to block 440 in FIG. 4, if the user does not have merchant-specific loyalty information that correspond to the identified merchant system 120 and/or POS terminal 127, the method 240 proceeds to block 460.

In block 460, the user computing device 110 determines whether the user has a merchant-specific financial account that correspond to the identified merchant system 120 and/or POS terminal 127. In an example embodiment, the user computing device 110 cross-references the identity of the merchant system 120 and/or POS terminal 127 with the financial account information saved by the secure element 117.

If the user has merchant-specific financial account information that correspond to the identified merchant system 120 and/or POS terminal 127, the method 240 proceeds to block 470. In block 470, the user computing device 110 enables the merchant-specific financial account information. In an example embodiment, the digital wallet application 115 is only capable of enabling and communicating open loop or non-merchant specific financial account information during a payment transaction with a POS terminal 127 unless the merchant system 120 is identified. In this embodiment, the private or merchant-specific financial account information cannot be transmitted to an unidentified merchant system 120. If the merchant system 120 is unidentified, the user computing device 110 has no way of knowing whether the merchant system 120 can accept and process a payment transaction using a merchant-specific financial account. By identifying the merchant system 120, the user computing device 110 can enable payment by a merchant-specific financial account that would otherwise not be used.

The method 240 then proceeds to block 480 in FIG. 4.

Returning to block 460 in FIG. 4, if the user does not have merchant-specific financial account information that correspond to the identified merchant system 120 and/or POS terminal 127, the method 240 proceeds to block 480.

In block 480, the user computing device 110 determines whether the user has an account maintained by the management system 130. In an example embodiment, the user has enabled a feature or application 115 on the user computing device 110 that links the user's management system 130 account to the user computing device 110. In this embodiment, when the user computing device 110 determines whether the user has an account maintained by the management system 130, the user computing device 110 further determines whether the user has authorized the user computing device 110 to transmit the merchant identifier and/or a user account identifier to the management system 130.

If the user has not authorized the user computing device 110 to transmit the merchant identifier and/or the user's account identifier to the management system 130, the method 240 proceeds to block 250 in FIG. 2.

Returning to block 480 in FIG. 4, if the user has authorized the user computing device 110 to transmit the merchant identifier and/or the user's account identifier to the management system 130, the method 240 proceeds to block 485. In block 485, the user computing device 110 transmits the merchant identifier and/or the user's account identifier to the management system 130. In an example embodiment, the information is transmitted to the management system 130 via the network 140. In this embodiment, user computing device 110 establishes a network 140 connection with the management system 130 and transmits the identifier(s). In another example embodiment, the user computing device 110 also transmits notification of the intended payment transaction.

In block 490, the management system 130 communicates with the merchant system 120. In an example embodiment, the management system 130 can use the user account identifier to identify the user and the merchant identifier to identify the merchant system 120 and/or POS terminal 127. In an example embodiment, the management system 130 can utilize a network 140 connection with the merchant system 120 to transmit larger amounts of data to the POS terminal 127 for use in the payment transaction with the user. The method for communicating with a merchant system 120 is described in more detail hereinafter with reference to the methods described in FIG. 5.

Figure 5:
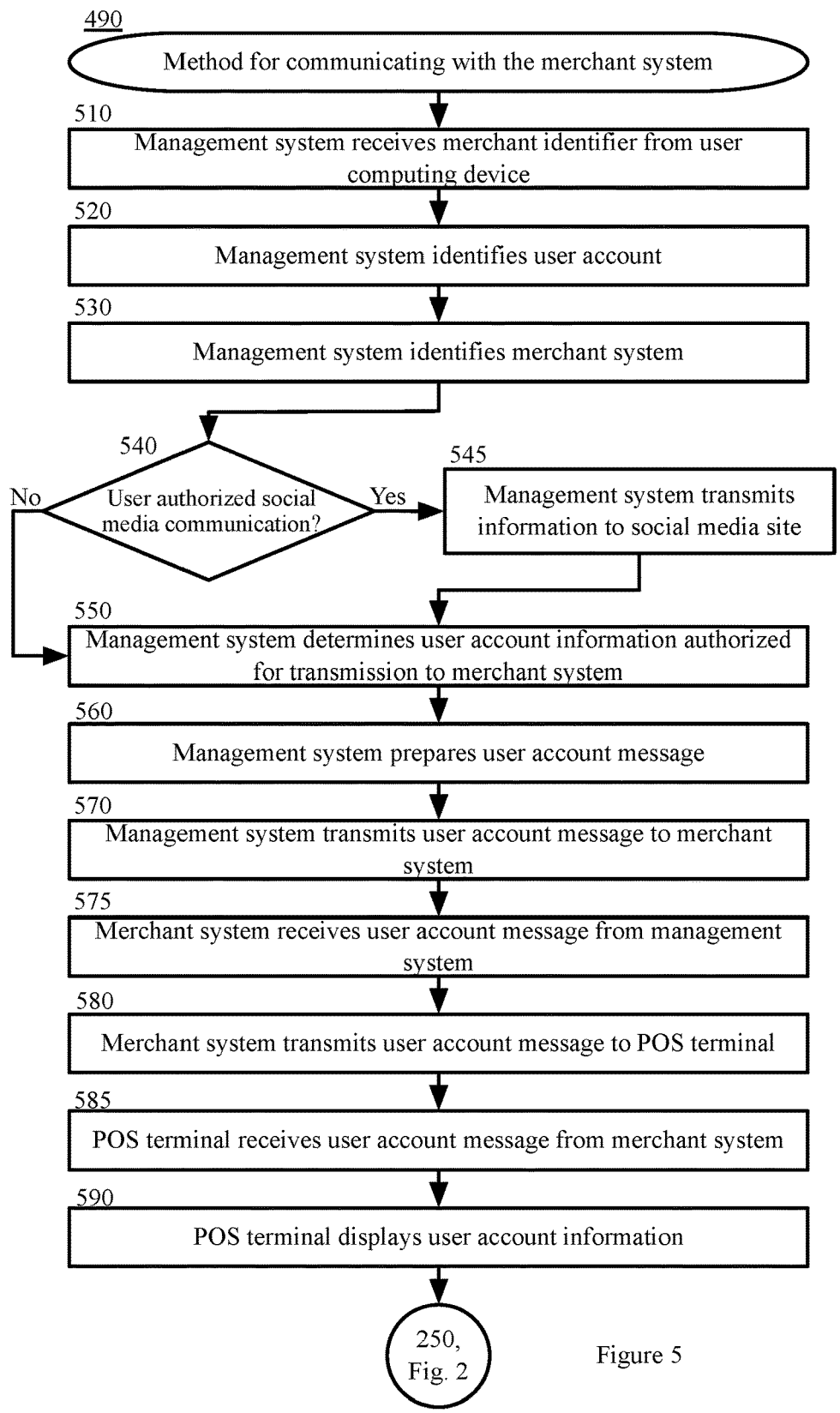
FIG. 5 is a block flow diagram depicting a method for communicating with a merchant system, in accordance with certain example embodiments.

FIG. 5 is a block flow diagram depicting a method 490 for communicating with a merchant system 120, in accordance with certain example embodiments, as referenced in block 490. The method 490 is described with reference to the components illustrated in FIG. 1.

In block 510, the management system 130 receives the merchant identifier and/or user's account identifier from the user computing device 110. In an example embodiment, the identifiers are received in real-time with the communications between the user computing device 110 and the proximity communication payment terminal 123.

In block 520, the management system 130 identifies the user's account. In an example embodiment, the notification transmitted to the management system 130 by the user computing device 110 comprises a user account identifier. In this embodiment, the user has previously created a management system 130 account and received an account identifier. In an example embodiment, the account identifier comprises a user name, code, e-mail address, phone number, user computing device 110 identifier, or other identifier that uniquely identifies the user's management system 130 account. In an example embodiment, the management system 130 communicates the user account identifier to the user computing device 110. In another example embodiment, the user links the user computing device 110 to the user's management system 130 account. In an example embodiment, the management system 130 cross-references the user account identifier received in the transmission from the user computing device 110.

In block 530, the management system 130 identifies the merchant system 120. In an example embodiment, the notification transmitted to the management system 130 by the user computing device 110 comprises a merchant identifier or an identification of the merchant system 120 and/or POS terminal 127. In an example embodiment, the merchant system 120 has established an account with the management system 130 or otherwise registered for services provided by the management system 130. In this embodiment, the services may comprise one or more of an identification of the user, the user's preferences, the user's past purchases with the merchant system 120, offer distribution, loyalty account management, or other merchant system 120 services. In this embodiment, the management system 130 is capable of communicating directly with the merchant system 120. For example, the merchant system 120 has provided an e-mail or network address that allows the management system 130 to provide information to the merchant system 120 for display at the POS terminal 127. In an example embodiment, the management system 130 transmits the information via the network 14.

In block 540, the management system 130 determines whether the user authorized social media communications. In an example embodiment, the user defined one or more user preferences when creating or modifying the user's management system 130 account. In this embodiment, the user can link one or more social media profiles to the user's management system 130 account and authorize the management system 130 to "check in" or signify that the user is at the merchant location on the social media site. In another example embodiment, the user can define or authorize this feature on the user computing device 110. In this embodiment, the notification received by the management system 130 from the user computing device 110 may comprise an instruction authorizing the management system 130 to check in the user on the social site. In another example embodiment, the management system 130 can transmit social medial profile information to the merchant system 120 to enable the merchant system 120 to "check in" of signify that the user is at the merchant location on the social media site. Because the management system 130 can communicate via the network 140 and is not limited to the small bandwidth of the proximity connection, the user can utilize the management system 130 to perform additional merchant-specific functions once the merchant system 120 is identified.

If the user has authorized social media communications, the method 490 proceeds to block 545 in FIG. 5. In block 545, the management system 130 transmits check-in information to the social media site. In an example embodiment, the management system 130 accesses the social media site and performs a function to indicate that the user is at the merchant location. In another example embodiment, the management system 130 can transmit social medial profile information to the merchant system 120 to enable the merchant system 120 to "check in" of signify that the user is at the merchant location on the social media site.

The method 490 then proceeds to block 550 in FIG. 5.

Returning to block 540 in FIG. 5, if the user has not authorized social media communications, the method 490 proceeds to block 550 in FIG. 5. In block 550, the management system 130 determines what user information the user has authorized the management system 130 to transmit to the merchant system 120. In an example embodiment, the user can authorize the release of certain user account information to the merchant system 120 (for example, the user name, e-mail address, photograph of the user, user preferences, user's merchant-specific preferences, merchant loyalty information, the user's past purchases with the merchant, and other user-related information). In an example embodiment, the merchant system 120 can define or request certain user information when establishing the management system 130 account. For example, the merchant system 120 can request that the user's name and photograph be sent each time the POS beacon communication protocol is utilized. After this information is sent to the POS terminal 127, the merchant can identify the user by name and confirm the user's identity.

In an example embodiment, the user can authorize release of certain user information for each merchant system 120. In another example embodiment, the user can authorize release of different information for certain merchant systems 120. For example, Merchant A can receive the user's name, photograph, and purchase preferences. However, Merchant B can only receive the user's name. In an example embodiment, the user can modify these preferences or disable this feature at any time.

In block 560, the management system prepares a user account message for transmission to the merchant system 120. In an example embodiment, the user account message comprises a listing of the information authorized by the user to be disclosed to the merchant system 120. In another example embodiment, the management system 130 determines which of the user account information authorized for disclosure are requested by the merchant system 120 for the user account message. In an example embodiment, the user account message comprises an identification of the POS terminal 127 that is communicating with the user computing device 110.

In block 570, the management system 130 transmits the user account message to the merchant system 120. In an example embodiment, the user account message is transmitted via the network 140 to the network or e-mail address provided by the merchant system 120.

In block 575, the merchant system 120 receives the user account message from the management system 130. In an example embodiment, the merchant system 120 identifies the POS terminal 127 identified in the user account message.

In block 580, the merchant system 120 transmits the user account message to the POS terminal 127 identified in the user account message. In another example embodiment, the merchant system 120 processes and extracts the user account information from the user account message and transmits a new or modified message to the POS terminal 127 that comprises the extracted user account information.

In block 585, the POS terminal 127 receives the user account message from the merchant system 120. In an example embodiment, the POS terminal 127 processes and/or extracts the user account information from the message.

In block 590, the POS terminal 127 displays the user account information on the POS terminal 127. In this embodiment, the merchant can then view the user account information as displayed on the POS terminal 127 and interact with the user.

The method 490 then proceeds to block 250 in FIG. 2.

Returning to FIG. 2, in block 250, the POS terminal 127 computes a price of the purchase transaction. In an example embodiment, the POS terminal 127 has received the merchant-specific offers, loyalty information, rewards, and other information from the user computing device 110 and/or management system 130. The POS terminal 127 uses the information received to compute an adjusted price for the purchase transaction. For example, the POS terminal 127 subtracts the value of any offers, rewards, or other incentives from the value of the transaction to compute an adjusted price for the transaction.

In block 260, the POS terminal 127 transmits a payment request to the user computing device 110 via the secure communication channel between the proximity communication payment terminal 123 and the user computing device 110. In an example embodiment, the POS terminal 127 transmits the payment request to the proximity communication payment terminal 123, and the proximity communication payment terminal 123 transmits the payment request to the user computing device 110 via the secure communication channel. In an example embodiment, the payment request comprises a request for payment information to complete the purchase transaction for the adjusted payment price. In an example embodiment, the payment request is understood by the secure element 117 as a request for financial account information.

In block 270, the user computing device 110 receives the payment request. In an example embodiment, the payment request is received by the application 115 and routed to the secure element 117 for processing.

In block 280 the user computing device 110 processes the payment request. In an example embodiment, the secure element 117 processes the payment request by reviewing user-define payment rules, selecting a payment account, and transmitting a response to the payment request. The method for processing a payment request is described in more detail hereinafter with reference to the methods described in FIG. 6.

Figure 6:
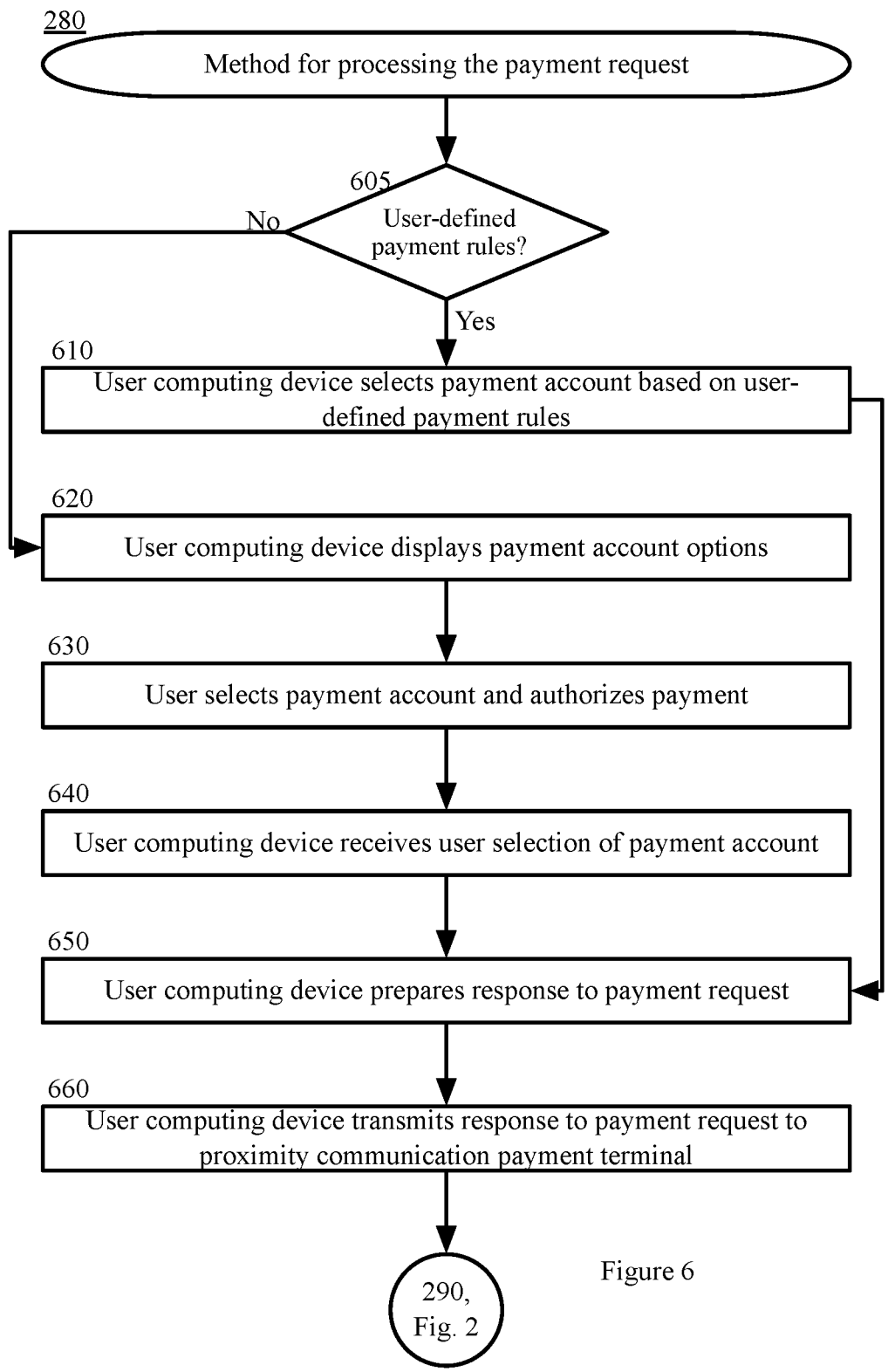
FIG. 6 is a block flow diagram depicting a method for processing a payment request, in accordance with certain example embodiments.

FIG. 6 is a block flow diagram depicting a method 280 for processing a payment request, in accordance with certain example embodiments, as referenced in block 280. The method 380 is described with reference to the components illustrated in FIG. 1.

In block 605, the user computing device 110 determines whether the user had defined one or more payment rules for selecting a financial account. In an example embodiment, the user computing device 110 has enabled a merchant-specific payment account in block 470 of FIG. 4. In this embodiment, the user can define a payment rule that instructs the user computing device 110 to select the enabled merchant-specific payment account to process the payment request.

In another example embodiment, the user can define a rule that selects a financial account when the merchant system 120 belongs to one or more merchant categories (for example, if the merchant system 120 is a gas station, restaurant, or grocery store). In yet another example embodiment, the user can define a rule that selects a financial account when the purchase price is over a pre-define threshold (for example, a debit account is used when the purchase price is at or below $100 and a credit account is used when the purchase prices is above $100).

If the user has one or more defined payment rules for selecting a financial account, the method 280 proceeds to block 610. In block 610, the user computing device selects the payment account based on the user-defined rules. In an example embodiment, the rules are understandable by the user computing device 110, and the user computing device 110 can select the financial account without further user involvement.

The method 280 then proceeds to block 650 in FIG. 6.

Returning to block 605, if the user does not have one or more defined payment rules for selecting a financial account, the method 280 proceeds to block 620. In block 620, the user computing device 110 displays the payment account options on the user interface 111. In an example embodiment, the payment account options comprise a merchant-specific financial account enabled in block 470 of FIG. 4. In an example embodiment, the financial accounts are displayed in a listing by account nickname or an account identifier that enables the user to pick the financial account for use in the payment transaction.

In block 630, the user selects the payment account from the listing on the user interface 111. In an example embodiment, the user authorizes payment of the payment request via the selected payment account. In an example embodiment, the user tap on the selected account, selects a button, or otherwise indicates to the user computing device 110 which financial account to select.

In block 640, the user computing device 110 receives the user's selection of the payment account.

In block 650, the user computing device 110 prepares a response to the payment request. In an example embodiment, the response to the payment request comprises the selected financial account information. In this embodiment, the secure element 117 prepares the response to enable the POS terminal 127 to process a payment transaction using the selected financial account.

In block 660, the user computing device 110 transmits the response to the payment request to the POS terminal 127 via the proximity communication payment terminal 123. In an example embodiment, the response to the payment request is transmitted via the secure communication channel to the proximity communication payment terminal 123. The proximity communication payment terminal 123 transmits the received response to the POS terminal 127. In an example embodiment, the response is encrypted by the secure element 117 so only the POS terminal 127 is capable of reading the financial account information contained in the response.

The method 280 then proceeds to block 290 in FIG. 2.

Returning to FIG. 2, in block 290, the POS terminal 127 receives the response to the payment request. In an example embodiment, the POS terminal 127 reads the financial account information contained in the response and processes the payment transaction. In an example embodiment, the POS terminal 127 communicates a payment notification to the issuer of the financial account information to obtain a payment approval and complete the payment transaction.

In an example embodiment, upon payment approval, the POS terminal 127 can provide an electronic receipt to the user computing device 110 via the proximity communication payment terminal 123 and/or the management system 130. Because the user computing device 110 and the management system 130 have identified the merchant system 120, they can augment the receipt with additional merchant and store-level detail. In this embodiment, the management system 130 can communicate the augmented receipt data to the user computing device 110 via the network 140 or save the augmented receipt data in the user's management system 130 account.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to facilitate payments with merchant-specific financial accounts during proximity payment transactions, comprising by a user computing device:
   detecting a radio frequency field generated by a merchant computing device add-on component, a user operating the user computing device desiring to complete a payment transaction with a merchant operating the merchant computing device;
   during creation of a communication channel, receiving, from the merchant computing device add-on component, a list of communication protocols comprising a modified handshake communication protocol enabling devices to transmit payment and additional information in a bi-direction communication via a secure bi-directional proximity communication channel;
   establishing the secure bi-directional proximity communication channel between the merchant computing device add-on component and the user computing device using the modified handshake communication protocol, the confirmation of capability causing transmission of a merchant identifier from the merchant computing device add-on component via the established secure bi-directional proximity communication channel;
   receiving the merchant identifier from the merchant computing device add-on component via the secure bi-directional proximity communication channel using the modified handshake communication protocol;
   determining that a merchant-specific private label financial account is available for use during the payment transaction based on the received merchant identifier, the merchant-specific account limited to use only during payment transactions with the merchant associated with the received merchant identifier and differing from open loop financial account that can be used at unlimited locations;
   enabling the merchant-specific account for use during the payment transaction;
   receiving a payment request via the secure bi-directional proximity communication channel from the merchant computing device add-on component for the payment transaction, the add-on component receiving the payment request from a merchant computing device payment component;
   preparing a response comprising the enabled merchant-specific account information; and
   transmitting the response to the add-on component via the secure bi-directional proximity communication channel, the merchant computing device add-on component communicating the response to the payment component for payment processing.

2. The computer-implemented method of claim 1, further comprising, by the user computing device:
   enabling a merchant-specific functionality for use during the payment transaction with the merchant, the merchant-specific functionality comprising a merchant-specific functionality element that is limited to use only during payment transactions with the merchant associated with the received merchant identifier; and
   transmitting the merchant-specific functionality element to the add-on component via the secure bi-directional proximity communication channel, the merchant computing device add-on component transmitting the merchant-specific functionality element to the payment component and the payment component adjusting the payment transaction in response to receiving the merchant-specific functionality element.

3. The computer-implemented method of claim 2, wherein the payment request comprises a request for payment for the adjusted payment transaction.

4. The computer-implemented method of claim 1, wherein the modified handshake communication protocol enables the merchant computing device add-on component to convey the merchant identifier to the user computing device prior to conveying the payment request.

5. The computer-implemented method of claim 1, wherein the modified handshake communication protocol communication protocol comprises a non-Proximity Payment System Environment (non-PPSE) protocol.

6. The computer-implemented method of claim 1, wherein the secure bi-directional proximity communication channel comprises a near field communication channel.

7. A computer program product, comprising:
   a non-transitory computer-readable medium having computer-readable program instructions embodied therein that when executed by a computer cause the computer to facilitate payments with merchant-specific financial accounts during proximity payment transactions, the computer-readable program instructions comprising computer-readable program instructions to:
   detect a radio frequency field generated by a merchant computing device add-on component;
   receive, during creation of a communication channel, a list of communication protocols from the merchant computing device add-on component via the radio frequency field, the list of communication protocols comprising a modified handshake communication protocol that enables devices engaged in a payment transaction to transmit payment and additional information in a bi-direction communication via a secure bi-directional proximity communication channel;
   establish the secure bi-directional proximity communication channel with the merchant computing device using the modified handshake communication protocol, the confirmation of capability causing transmission of a merchant identifier from the merchant computing device add-on component via the established secure bi-directional communication channel;
   receive the merchant identifier from the merchant computing device add-on component via the secure bi-directional proximity communication channel using the modified handshake communication protocol;
   determine that a merchant-specific private label financial account is available for use during the payment transaction based on the received merchant identifier, the merchant-specific private label financial account limited to use only during payment transactions with a merchant associated with the received merchant identifier and differing from open loop financial account that can be used at unlimited locations;
   enable the merchant-specific financial account for use during the payment transaction;
   receive a payment request via the secure bi-directional proximity communication channel from the merchant computing device for the payment transaction, the merchant computing device add-on component receiving the payment request from a merchant computing device payment component;

prepare a response to the payment request for the payment transaction, the response comprising the enabled merchant-specific private label financial account information; and transmit a response to the payment request to the merchant computing device add-on component via the secure bi-directional proximity communication channel, the merchant computing device add-on component communicating the response to the payment request to the merchant computing device payment component for payment processing.

8. The computer program product of claim 7, wherein the modified handshake communication protocol enables the merchant computing device add-on component to convey the merchant identifier to a user computing device prior to conveying the payment request.

9. The computer program product of claim 7, wherein the modified handshake communication protocol comprises a non-Proximity Payment System Environment (non-PPSE) protocol.

10. The computer program product of claim 7, wherein the secure bi-directional proximity communication channel comprises a near field communication channel.

11. A system to facilitate payments with merchant-specific financial accounts during proximity payment transactions, comprising:
a storage device; and
a processor communicatively coupled to the storage device, wherein the processor executes application code instructions that are stored in the storage device to cause the system to:
detect a radio frequency field generated by a merchant computing device add-on component;
receive, during creation of a communication channel, a list of communication protocols from the merchant computing device add-on component via the radio frequency field, the list of communication protocols comprising a modified handshake communication protocol that enables devices engaged in a payment transaction to transmit payment and additional information in a bi-direction communication via a secure bi-directional proximity communication channel;
establish the secure bi-directional proximity communication channel with the merchant computing device add-on component using the modified handshake communication protocol, the confirmation of capability causing transmission of a merchant identifier from the merchant computing device add-on component via the established secure bi-directional communication channel;
receive the merchant identifier from the merchant computing device add-on component via the secure bi-directional proximity communication channel using the modified handshake communication protocol;
determine that a merchant-specific private label financial account is available for use during the payment transaction based on the received merchant identifier, the merchant-specific private label financial account limited to use only during payment transactions with a merchant associated with the received merchant identifier and differing from open loop financial account that can be used at unlimited locations;
enable the merchant-specific financial account for use during the payment transaction;
receiving a payment request via the secure bi-directional proximity communication channel from the merchant computing device add-on component for the payment transaction, the merchant computing device add-on component receiving the payment request from a merchant computing device payment component;
prepare a response to the payment request for the payment transaction, the response comprising the enabled merchant-specific private label financial account information; and
transmit a response to the payment request to the merchant computing device add-on component via the secure bi-directional proximity communication channel, the merchant computing device add-on component communicating the response to the payment request to the merchant computing device payment component for payment processing.

12. The system of claim 11, wherein the modified handshake communication protocol enables the merchant computing device add-on component to convey the merchant identifier to a user computing device prior to conveying the payment request.

13. The system of claim 11, wherein the modified handshake communication protocol comprises a non-Proximity Payment System Environment (non-PPSE) protocol.

14. The system of claim 11, wherein the secure bi-directional proximity communication channel comprises a near field communication channel.

15. The system of claim 11, wherein the processor is further configured to execute computer-executable instructions stored in the storage device to cause the system to:
enable a merchant-specific functionality for use during the payment transaction with the merchant, the merchant-specific functionality comprising a merchant-specific functionality element that is limited to use only during payment transactions with the merchant associated with the received merchant identifier; and
transmit the merchant-specific functionality element to the merchant computing device add-on component via the secure bi-directional proximity communication channel, the merchant computing device add-on component transmitting the merchant-specific functionality element to the merchant computing device payment component and the merchant computing device payment component adjusting the payment transaction in response to receiving the merchant-specific functionality element.

* * * * *